United States Patent [19]

Chen

[11] 4,029,620

[45] June 14, 1977

[54] BLENDS OF PARTIALLY NEUTRALIZED CARBOXYL FUNCTIONAL COPOLYMERS AND EPOXY RESINS IN AQUEOUS EMULSION

[75] Inventor: Albert C. Chen, East Brunswick, N.J.

[73] Assignee: Mobil Oil Corporation, New York, N.Y.

[22] Filed: Aug. 13, 1975

[21] Appl. No.: 604,286

[52] U.S. Cl. ................. 260/29.6 NR; 260/29.2 EP

[51] Int. Cl.[2] .......................................... C08L 33/02

[58] Field of Search ............ 260/29.6 NR, 29.2 EP, 260/33.2 EP

[56] References Cited

UNITED STATES PATENTS

| | | | |
|---|---|---|---|
| 2,954,358 | 9/1960 | Hurwitz | 260/29.6 NR |
| 3,669,911 | 6/1972 | Najvar | 260/861 |
| 3,908,049 | 9/1975 | Fitko | 260/29.6 NR |
| 3,945,964 | 3/1976 | Hastings | 260/29.6 NR |

FOREIGN PATENTS OR APPLICATIONS

| | | | |
|---|---|---|---|
| 732,653 | 4/1966 | Canada | 260/29.6 NR |

OTHER PUBLICATIONS

Potter, Epoxide Resins, London Iliffe, 1972.

*Primary Examiner*—M. J. Welsh
*Attorney, Agent, or Firm*—Charles A. Huggett

[57] ABSTRACT

A thermally curable aqueous emulsion coating composition is provided in which liquid particles of resinous polyepoxide are emulsified by means of a nonionic surfactant and there is also present an organic solvent soluble carboxyl functional copolymer which is dispersed by means of salt formation utilizing partial neutralization with ammonia or an amine to disperse the copolymer, the combination of nonionic surfactant emulsification of the epoxy resin and partial neutralization of the copolymer carboxyl serving to provide storage stability for this otherwise unstable system.

13 Claims, No Drawings

BLENDS OF PARTIALLY NEUTRALIZED CARBOXYL FUNCTIONAL COPOLYMERS AND EPOXY RESINS IN AQUEOUS EMULSION

The present invention relates to blends of acrylic copolymers and epoxy resins in aqueous emulsion.

Epoxy resins are well known curing agents for acrylic copolymers containing carboxyl functionality, but these are normally used in organic solvent solution. The carboxyl-functional acrylic copolymers can be dispersed in water by reacting the carboxyl group with a volatile base, typically an amine, to form a salt which permits the copolymer salt to be dissolved or colloidally dispersed in water. However, the basic material introduced for salt formation catalyzes the epoxy-carboxy curing reaction, and the mixtures become too unstable for effective utilization in commerce.

In this invention, the epoxy resin is dispersed in the water in emulsion form using a nonionic surfactant, and the carboxyl copolymer is only partially neutralized. In this way, the concentration of basic material in the water phase is minimized, and the nonionic surfactant protects the relatively large particles of epoxy resin from the basic material.

In a preferred system, ammonia is used as the volatile base in preference to the amines normally used, and this permits a greater extent of partial neutralization up to about 90%. On the other hand, amines are useful when partial neutralization is kept below 30%, preferably below 20%.

In this way, thermally curable aqueous emulsion coating compositions are provided which combine a good cure with extended storage stability. While storage at room temperature is intended, elevated temperatures are encountered, and storage stability is normally checked by testing at 90° and 120° F. Cure is tested by noting the solvent resistance of the cured film.

The carboxyl copolymer which is normally acrylic consists essentially of copolymerized monoethylenic monomers comprising from 4–20%, preferably 5–12%, by weight of carboxyl functional monomer. The balance of the copolymer consists essentially of nonreactive monoethylenic monomers, such as methyl methacrylate, ethyl acrylate, butyl and isobutyl acrylate and methacrylate, and corresponding crotonates and itaconates, styrene, acrylonitrile, and the like. A small proportion of hydroxy functional monomer can be tolerated, and some amine or amide functional monomer can also be present, but the essential curing reaction is between the carboxyl groups of the copolymer and the epoxy groups of the epoxy resin.

The carboxyl functional monomer is normally made by copolymerization in water miscible organic solvent solution in order to provide a polymer which is highly soluble in organic solvent.

Many carboxyl functional monoethylenic monomers are available to provide the desired carboxyl functionality. Acrylic acid and methacrylic acid are preferred, but crotonic acid, itaconic acid, maleic acid, monobutyl maleate, and the like, are well useful.

The epoxy resin may be any resinous polyepoxide which is liquid at room temperature or which can be dissolved in an organic solvent of limited water solubility so as to be emulsifiable into an aqueous medium by means of a nonionic surfactant. Bisphenol-based polyepoxides are particularly preferred, especially those having a 1,2-epoxy equivalency of about 1.4 to about 2.0. The well known Shell commercial resins Epon 828 and Epon 1001 will be used as illustrative, these being diepoxides based on bisphenol A. Diepoxides of higher molecular weight are also useful, as illustrated by Epon 1004 and Epon 1007. Normally solid diepoxides having a molecular weight of from about 400 to about 6000 are preferred, these being used in the form of a liquid solvent solution containing 5–50% of a generally water immiscible organic solvent, preferably from 30–40% solvent, based on the epoxide.

The epoxy resin is used to cross-link the carboxyl functionality of the copolymer, and this means employing at least about a stoichiometric proportion thereof. Some excess epoxy functionality up to about 25% can be used, but one would normally operate from stoichiometric equivalence up to a 20% excess of epoxy groups.

Any volatile amine may be used to solubilize the acrylic copolymer, these amines including primary, secondary and tertiary amines, and hydroxy amines. Thus, one can use butyl amine, dibutyl amine, triethyl amine, or dimethyl ethanol amine, so long as the extent of neutralization of the carboxyl functionality in the copolymer is less than about 30%, preferably less than about 20%. The minimum extent of neutralization will vary from polymer to polymer and is determined solely by how much is needed to provide a stable dispersion in water. Thus, one uses the selected amine in an amount to provide a stable water dispersion up to a maximum set forth above, but at least 10% neutralization is usually needed. The preferred amines are tertiary amines containing only alkyl or hydroxy alkyl substituents.

Ammonia is uniquely different. More of it can be tolerated, and while one can use small amounts, as with amines, a better cure is obtained using more than 40% neutralization, preferably more than 60% neutralization, up to a maximum of about 90% neutralization as noted earlier.

This capacity to tolerate more ammonia without encountering serious instability is a curious one.

It should be observed that the salts of the carboxyl copolymers are themselves emulsifying agents, but in this invention a nonionic surfactant is used to emulsify the epoxy resin particles in the aqueous alkaline medium. It is thought that the nonionic surfactant serves to effectively isolate the epoxy functionality in the emulsified particles from the carboxyl functionality and the volatile base in the aqueous continuum of the emulsion. The nonionic surfactant and the water miscible organic solvent in which the carboxyl copolymer is supplied also assist in dispersing the carboxyl copolymer, but it will be understood that the carboxyl copolymer is a solid in the absence of solvent at room temperature and is not stably dispersible in the aqueous continuum in the absence of some neutralization of its carboxyl groups. The solvent is used in a weight ratio to the copolymer of about 0.1:1 to 0.6:1.

The nonionic surfactant is normally used in an amount of from 0.5–10%, based on the total weight of resin (the polyepoxide and the copolymer).

Many nonionic surfactants are available, but the ethylene oxide adducts of hydrophobic organic compounds containing one or more active hydrogen atoms are preferred. Various suitable hydrophobes are available, such as octyl or nonyl phenol, alcohols containing from 8–22 carbon atoms, and polyoxypropylene. The ethylene oxide is adducted on to provide from 3 or more up to about 80 mols of ethylene oxide per mol of the hydrophobe.

It is particularly preferred to employ a polyoxyethylene derivative of a polyoxypropylene hydrophobe, these being known in commerce as pluronic surfactants, and being available from BASF Wyandotte Corporation. The product known as Pluronic F 127 will be used as illustrative, this being a solid, poorly water soluble surfactant having a polyoxypropylene hydrophobe of molecular weight 4000 adducted with sufficient ethylene oxide to provide about 70% polyoxyethylene in the total molecule.

The invention is illustrated in the examples which follow.

EXAMPLE 1

An acrylic copolymer was formed by solution copolymerization in butyl cellosolve to have the following composition.

| | | |
|---|---|---|
| Methyl methacrylate | | 46.79% |
| Styrene | | 7.50 |
| Ethyl acrylate | | 27.07 |
| Methacrylic acid | | 8.64 |
| | | 100.00% |
| Nonvolatile material | 70.8% in butyl cellosolve | |
| Acid number | 54.9 Mg KOH/g solid | |
| Reduced Viscosity | $Z_3$+ at 55% Nonvolatile material in butyl cellosolve | |

This acrylic copolymer was partially neutralized with dimethylaminoethanol to form two water solutions, one 25% neutralized, and the second 50% neutralized. Nonionic surfactant was incorporated in each solution as noted below.

| | Solution A 25% Neutralized | Solution B 50% Neutralized |
|---|---|---|
| Solids Content | 35.1% | 34.0% |
| Particle size | 99% less than 1 micron | 99% 1-2 microns |
| Surface tension | 34.4 | 34.0 |
| pH | 7.6 | 7.9 |
| Nonionic Surfactant | 1.54% | 1.33% |

EXAMPLE 2

Two epoxy resin emulsions are prepared as follows:

| | Emulsion A | Emulsion B |
|---|---|---|
| Diepoxide A (Epoxide equivalent wt. = 190) | 1,000 | — |
| Diepoxide B (Epoxide equivalent wt. = 500) | — | 1,000 |
| 2-hexoxyethanol | 200 | 450 |

-continued

| | Emulsion A | Emulsion B |
|---|---|---|
| Nonionic surfactant | 50 | 50 |
| Water | 1,000 | 1,400 |
| Nonvolatile material | 47.2% | 37.5% |
| pH | 7.0 | 7.0 |

Note - Epon 828 may be used as Diepoxide A, and Epon 1001 may be used as Diepoxide B.

Example 3

Mixtures were made using the solutions of Example 1 and the Emulsions of Example 2.

| | Mixture A | Mixture B | Mixture C | Mixture D |
|---|---|---|---|---|
| Solution A | 236 | 185 | — | — |
| Solution B | — | — | 244 | 191 |
| Emulsion A | 36 | — | 36 | — |
| Emulsion B | — | 93 | — | 93 |
| Neutralization Level | 25% | 25% | 50% | 50% |
| Acid/Epoxy (equivalent) | 1.0/1.1 | 1.0/1.1 | 1.0/1.1 | 1.0/1.1 |
| Acrylic/Epon (weight) | 83/17 | 65/35 | 83/17 | 65/35 |
| % Nonvolatile Material | 37.6 | 36.0 | 35.7 | 35.2 |
| $H_2O$/Organic solvent (volume) | 80/20 | 78/22 | 80/20 | 78/22 |
| Deposited Film Thickness (mils) | .1 - .2 | .1 - .2 | .1 - .2 | .1 - .2 |
| Methyl Ethyl Ketone (number of double rubs) | 50 | 50 | 50 | 50 |
| Film Removed | 5% | 5% | 5% | 5% |

As can be seen, all of the systems cure well initially when films thereof are baked at 375° F. for 4 minutes, 50 double rubs with a methyl ethyl ketone-saturated cloth removing only 5% of the weight of the film. However, after storage for 15 days at temperatures of 90° and 120° F., both of the 50% neutralized systems (Mixtures C and D) were either gelled or close to gelation, and not usable. The two 25% neutralized systems, (Mixtures A and B) remained useful, and the higher molecular weight species which used Emulsion B (Mixture B) was superior.

similar results to those described above are provided by replacing the dimethylaminoethanol with ammonia. When ammonia is used, the cure improves progressively as greater and greater proportions of ammonia are utilized, best results being obtained when from 60 to 90% of the carboxyl functionality is neutralized with ammonia. However, as the proportion of ammonia exceeds 90% of the amount needed to neutralize all of the carboxyl functionality in the copolymer, the storage stability of the system falls off, exactly as it did when more than 30% of amine is used as previously illustrated.

The invention is defined in the claims which follow.

I claim:

1. A thermally curable aqueous emulsion coating composition comprising an aqueous continuum having dispersed therein emulsified liquid particles of resinous polyepoxide, said polyepoxide particles being stably suspended by means of a nonionic surfactant used in an amount of from 0.5–10%, based on the total weight of resin, said aqueous continuum further containing an organic solvent-soluble carboxyl functional copolymer containing from 4–20% copolymerized monoethylenic monomer carrying the carboxyl group stably dispersed in the aqueous continuum by salt formation between some of the carboxy groups in the copolymer, and volatile base selected from organic amines and ammonia, the extent of neutralization of the copolymer carboxyl by said base being less than about 30% neutralization when amine is used and being up to about 90% when ammonia is used, said polyepoxide being present in an amount to provide at least about a stoichiometric proportion of epoxy functionality with respect to the carboxyl functionality of the copolymer, up to about a 25% excess of epoxy functionality.

2. An emulsion as recited in claim 1 in which said polyepoxide is a bisphenol based polyepoxide having a 1,2-epoxy equivalency of about 1.4 to about 2.0.

3. An emulsion as recited in claim 1 in which said nonionic surfactant is an ethylene oxide adduct of a hydrophobic organic compound containing from 3 to about 80 mols of ethylene oxide per mol of the hydrophobe.

4. An emulsion as recited in claim 3 in which said hydrophobe is selected from octyl or nonyl phenol, alcohols containing from 8–22 carbon atoms and polyoxypropylene.

5. An emulsion as recited in claim 4 in which said nonionic surfactant is a polyoxyethylene derivative of a polyoxypropylene hydrophobe.

6. An emulsion as recited in claim 5 in which said polyoxypropylene hydrophobe has a molecular weight of about 4000 and the ethylene oxide is adducted with the hydrophobe to provide about 70% of the molecule.

7. An emulsion as recited in claim 1 in which ammonia is used to neutralize more than 40% of the copolymer carboxyl.

8. An emulsion as recited in claim 7 in which ammonia is used to neutralize from about 60% to about 90% of the copolymer carboxyl.

9. An emulsion as recited in claim 1 in which said amine is used in an amount to neutralize from 10% to 20% of the copolymer carboxyl.

10. An emulsion as recited in claim 9 in which said amine is a tertiary amine containing only alkyl or hydroxyl alkyl substituents.

11. An emulsion as recited in claim 1 in which said copolymer is an acrylic copolymer, the balance of the copolymer, aside from the monomer carrying the carboxy group, consisting essentially of copolymerized nonreactive monoethylenic monomers.

12. A thermally curable aqueous emulsion coating composition comprising an aqueous continuum having dispersed therein emulsified liquid particles of normally solid resinous bisphenol based polyepoxide having a 1,2-epoxy equivalency of about 1.4 to about 2.0 dissolved in from 5–50% of generally water immiscible organic solvent, said polyepoxide particles being stably suspended by means of a nonionic surfactant in an amount of from 0.5–10%, based on the total weight of resin in the system, said aqueous continuum further containing an organic solvent-soluble carboxyl functional copolymer containing from 4–20% of copolymerized monoethylenic monomer carrying the carboxyl group dispersed in the aqueous continuum by salt formation between some of the carboxyl groups in the copolymer and a volatile base selected from organic amines and ammonia, the extent of neutralization of the copolymer carboxyl by said base being from about 10 to about 20% neutralization when an amine is used, and being from about 40 to about 90% when ammonia is used, said polyepoxide being present in an amount to provide at least about a stoichiometric proportion of epoxy functionality with respect to the carboxyl functionality of the copolymer, up to about a 25% excess of epoxy functionality.

13. An emulsion as recited in claim 12 in which said organic solvent comprises 2-hexoxyethanol.

* * * * *

UNITED STATES PATENT AND TRADEMARK OFFICE

CERTIFICATE OF CORRECTION

PATENT NO. : 4,029,620

DATED : June 14, 1977

INVENTOR(S) : Albert C. Chen

It is certified that error appears in the above-identified patent and that said Letters Patent are hereby corrected as shown below:

Column 1, line 46 "and corresponding" should be --the corresponding--.

Column 1, line 61 "well useful" should be --all useful--.

Column 4, line 37 "similar" should be --Similar--.

Column 4, line 62 "and volatile" should be --and a volatile--.

Signed and Sealed this

*Fourteenth* Day of *March 1978*

[SEAL]

*Attest:*

RUTH C. MASON
*Attesting Officer*

LUTRELLE F. PARKER
*Acting Commissioner of Patents and Trademarks*